(12) United States Patent
Kobayashi et al.

(10) Patent No.: US 7,344,331 B2
(45) Date of Patent: Mar. 18, 2008

(54) MOLDED PRODUCT ASSEMBLY AND FASTENER

(75) Inventors: Yohsuke Kobayashi, Aichi (JP); Yasuhiro Wato, Aichi (JP)

(73) Assignee: Tokai Kogyo Co., Ltd., Obu (JP)

( * ) Notice: Subject to any disclaimer, the term of this patent is extended or adjusted under 35 U.S.C. 154(b) by 103 days.

(21) Appl. No.: 10/941,868

(22) Filed: Sep. 16, 2004

(65) Prior Publication Data
US 2005/0095064 A1    May 5, 2005

(30) Foreign Application Priority Data
Sep. 26, 2003   (JP)   ............ P2003-334601

(51) Int. Cl.
*E25G 3/36* (2006.01)
*E04G 7/00* (2006.01)
*F16B 5/02* (2006.01)

(52) U.S. Cl. ............ 403/388; 403/397; 411/508; 411/509; 411/510; 411/903; 411/908; 411/910; 24/297; 24/453; 24/702

(58) Field of Classification Search .......... 24/297, 24/293, 292–295, 248, 388, 397, 408.1, 453, 24/702; 403/248, 388, 397, 408.1; 52/716.5, 52/718.04; 411/903, 908, 909, 913, 508–510
See application file for complete search history.

(56) References Cited

U.S. PATENT DOCUMENTS

| | | | | |
|---|---|---|---|---|
| 3,897,967 A | * | 8/1975 | Barenyi | ............ 293/120 |
| 5,630,522 A | * | 5/1997 | Montgomery | ............ 215/344 |
| 5,639,522 A | | 6/1997 | Maki et al. | |
| 6,074,150 A | * | 6/2000 | Shinozaki et al. | ............ 411/508 |
| 6,119,316 A | * | 9/2000 | Ishihara et al. | ............ 24/297 |
| 6,405,413 B2 | * | 6/2002 | Ichimaru et al. | ............ 24/297 |
| 6,449,814 B1 | * | 9/2002 | Dinsmore et al. | ............ 24/297 |
| 6,938,705 B2 | * | 9/2005 | Kikuchi | ............ 173/201 |

FOREIGN PATENT DOCUMENTS

| | | |
|---|---|---|
| JP | U-64-24715 | 2/1989 |
| JP | U-2-142356 | 12/1990 |
| JP | U-05-042723 | 6/1993 |
| JP | A-6-278550 | 4/1994 |
| JP | A 9-226476 | 9/1997 |
| JP | A-11-30214 | 2/1999 |

* cited by examiner

*Primary Examiner*—Daniel P. Stodola
*Assistant Examiner*—Nahid Amiri
(74) *Attorney, Agent, or Firm*—Oliff & Berridge, PLC

(57) ABSTRACT

A molded product assembly includes a molded product being mountable to a body to be mounted having a mounting hole via a fastener. The molded product has a post projecting toward the mounting hole and disposed on a back surface of the molded product, at least a part of the post projecting through the mounting hole to a back surface side of the body to be mounted, and a holding portion disposed on the part of the post to hold the fastener. The fastener has a portion to be held that is held by the holding portion, and an elastic engagement leg being elastically deformable and having an engagement portion to be engaged with a peripheral edge of the mounting hole, the elastic engagement leg being located on the back surface side of the body to be mounted.

11 Claims, 8 Drawing Sheets

MOLDED PRODUCT ASSEMBLY AND FASTENER

BACKGROUND OF THE INVENTION

1. Field of the Invention

The present invention relates to a molded product assembly that can be mounted on a plate-shaped body to be mounted, and to a fastener.

2. Description of the Related Art

A resin molded product such as a body side molding for a vehicle is attached on the vehicle body panel by a mounting clip mounted on a back surface side of the resin molded product, as disclosed in JP-A-9-226476, for example. In JP-A-9-226476, a clip holder shaped like a U-character is integrally molded along a back surface of the resin molded product, a base portion of the mounting clip is fitted and engaged into this clip holder to mount the mounting clip on the back surface of the resin molded product, and a pair of elastic engagement pieces integrally molded on the back surface of the mounting clip are inserted and engaged into a mounting hole of the vehicle body panel to attach the resin molded product on the vehicle body panel.

SUMMARY OF THE INVENTION

By the way, a clearance between the back surface of the resin molded product and the vehicle body panel may be very narrow (e.g., 5 mm or less), depending on the outside specifications of the automobile. However, in a mounting structure of JP-A-9-226476, since the clip holder for engaging and holding the base portion of the mounting clip is formed on the back surface of the resin molded product, it is difficult to secure an enough space for providing the clip holder (base portion for the mounting clip) in the outside specifications in which the clearance between the back surface of the resin molded product and the vehicle body panel is narrow, resulting in a problem that the resin molded product is attached on the vehicle body panel with difficulty.

This invention has been achieved in view of the above-mentioned problem, and an object of the invention is to allow a molded product to be attached on a body to be mounted, even when a clearance between a back surface of the molded product and a body to be mounted is narrow.

In order to accomplish the above object, according to a first aspect of the invention, there is provided a molded product assembly including: a molded product having a predetermined shape; and a fastener attached to a back surface side of the molded product; wherein the molded product is mountable to a plate-shaped body to be mounted having a mounting hole via the fastener that is inserted into the mounting hole to engage with the mounting hole; wherein the molded product includes: a post projecting toward the mounting hole and disposed on a back surface of the molded product, at least a part of the post projecting through the mounting hole to a back surface side of the body to be mounted in mounting the molded product assembly to the body to be mounted; and a holding portion disposed on the part of the post to hold the fastener; and wherein the fastener includes: a portion to be held that is held by the holding portion; and an elastic engagement leg being elastically deformable and having an engagement portion to be engaged with a rim of the mounting hole, the elastic engagement leg being located on the back surface side of the body to be mounted.

With this constitution, since on the back surface of the molded product, the post is formed to project to the back surface side of the body to be mounted beyond the mounting hole of the body to be mounted, and the fastener is held on the post, even when the clearance between the back surface of the molded product and the body to be mounted is narrow, the holding portion is not restricted by the clearance and the molded product is attached on the body to be mounted, using the post that projects to the back surface side of the body to be mounted through the mounting hole of the body to be mounted.

In this case, it is preferable that one of the holding portion of the post and the portion to be held of the fastener is a recess or a hole and the other is a projection that is formed to be fit and engaged with the recess or the hole. In this manner, the fastener is held on the post by a simply method of fitting (engagement) between the recess or hole and the projection.

Alternatively, the holding portion of the post and the portion to be held of the fastener maybe connected by a connecting member. With this constitution, the shapes of the holding portion of the post and the portion to be held of the fastener can be made simple, whereby there is an advantage that the structure of the mold for molding them is simplified, and the molding cost is reduced.

Also, the holding portion of the post and the portion to be held of the fastener may be connected by means of welding or plastic deformation. With this constitution, the shapes of the holding portion of the post and the portion to be held of the fastener can be made simple, whereby there is an advantage that the structure of the mold is simplified, and the molding cost is reduced.

By the way, as the height size or thickness size of the post of the molded product is increased, the shrinkage characteristic (especially shrinkage amount) of a portion for molding the post of the molded product at the time of molding differs from that of its peripheral portion, so that a sink occurs on the surface of the molded product under its influence, giving rise to a risk of impairing the appearance quality of the molded product.

Thus, it is preferable that the molded product has a hollow portion inside and the post is integrally molded on aback surface of the hollow portion. In this manner, even if a sink occurs due to a difference in the shrinkage characteristic between a portion for molding the post in the molded product and its peripheral portion, the sink occurs only on the hollow inner wall of the hollow portion which is not seen from the outside, so that the sink does not occur on the surface of the molded product. Therefore, the height size and the thickness size of the post are increased without causing sink on the surface of the molded product.

Also, it is preferable that the fastener is formed with a pair of the elastic engagement legs having the engagement portion around the post at least on both sides in the width direction, preferably on both sides in the width direction and the longitudinal direction. In this manner, the molded product can be mounted via the fastener in the mounting hole of the body to be mounted well-balanced and stably.

Further, it is preferable that the post has a shape in the form of a plate which is formed in the longitudinal direction and the fastener has a pinching portion on which the portion to be held is provided, the pinching portion pinching the post from both sides of the post in the width direction of the molded product.

Also, it is preferable that the post has a shape in the form of a plate which is formed in the longitudinal direction, the post has a pair of reinforcement ribs at a root portion thereof, the reinforcement ribs being formed in the longitudinal direction at a predetermined interval, and the fastener has a pinching portion on which the portion to be held is provided, the pinching portion pinching the post from both sides of the post in the width direction of the molded product, the pinching portion being located between the pair of reinforcement ribs. In this manner, the fastener is prevented from being displaced in the longitudinal direction and the fastener is properly positioned.

Further, it is preferable that the molded product is a long member, the post has a plurality of posts formed in a longitudinal direction of the molded product at intervals, and the fastener has a plurality of fasteners held by the plurality of posts respectively.

Also, it is preferred that the fastener is formed with the portion to be held that is held in the holding portion of the post to be located closer to a tip end of the post than the engagement portion. In this manner, the length of the elastic engagement leg having the engagement portion is easily secured, and when the engagement portion at the top end side of the elastic engagement leg is engaged with the edge of the mounting hole, the elastic engagement leg can be elastically deformed smoothly but not excessively.

Also, the engagement portion of the fastener may have a substantially recessed shape so as to be fitted to a rim of the mounting hole of the body to be mounted. In this manner, the engagement portion of the fastener is engaged and held with the rim of the mounting hole of the body to be mounted in a state where it is prevented from slipping off in any of the front and back directions, whereby the molded product can be attached on the body to be mounted without the fastener getting rid of the mounting hole of the body to be mounted even by a method of mounting the fastener alone in the mounting hole of the body to be mounted beforehand and then mounting the molded product with the fastener.

Also, the fastener may be made of elastic resin such as POM (polyacetal), PA (Polyamide) or PBT (Polybutyleneterephthalate) or elastic metal such as spring steel, for example. In this manner, the fastener having the aforementioned functions can be simply manufactured by injection molding of resin or press molding of metal.

Also, it is preferable that the elastic engagement leg has a plurality of elastic engagement legs located symmetrically about the portion to be held in a width direction and in a longitudinal direction of the fastener at intervals.

Further, it is preferable that the fastener has a bottom portion on four corners of which the elastic engagement legs are disposed respectively.

DETAILED DESCRIPTION OF THE PREFFERED EMBODIMENTS

Figure 1:
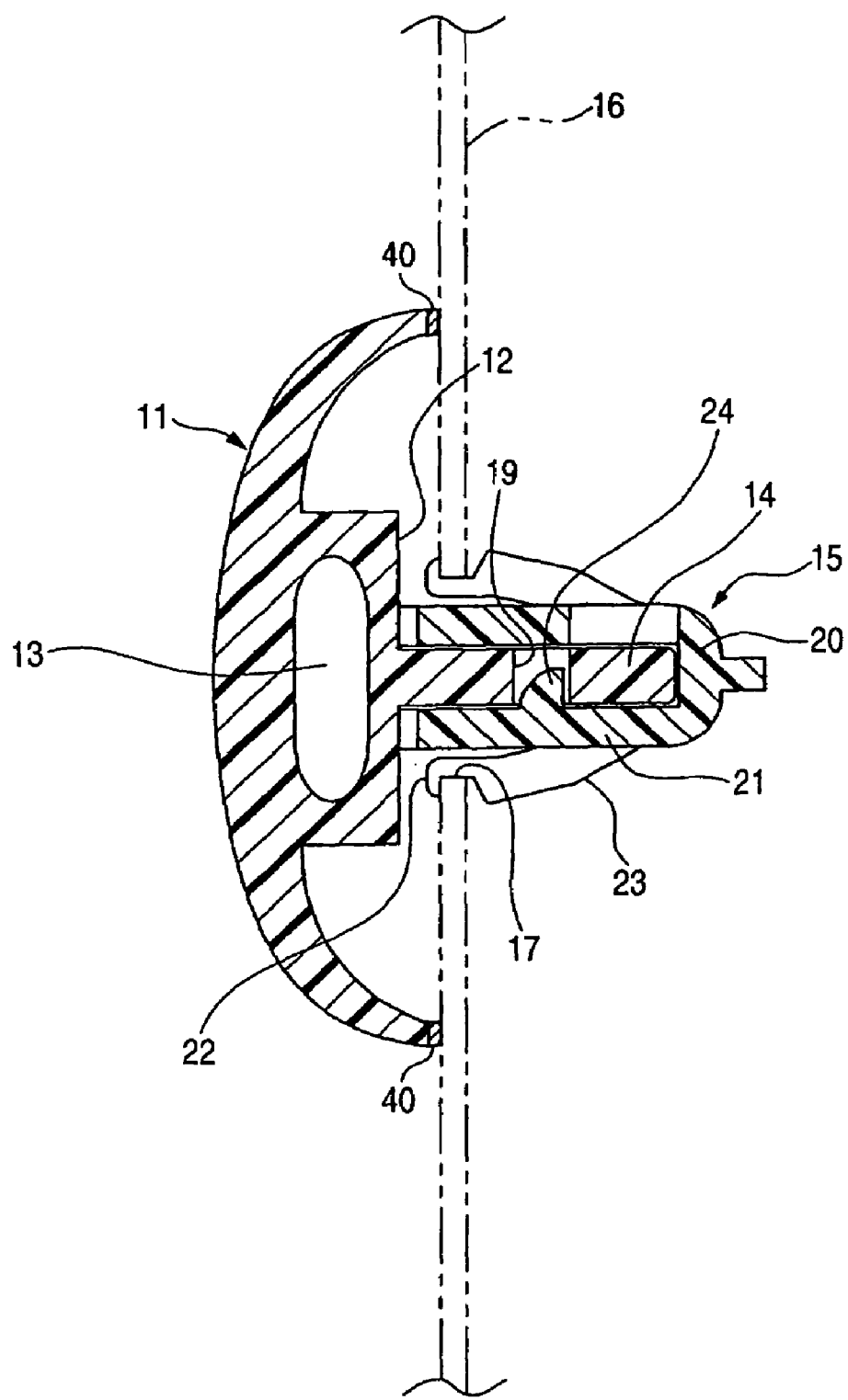
FIG. 1 is a cross-sectional view showing a structure for attaching a side molding according to a first embodiment.
Figure 2:
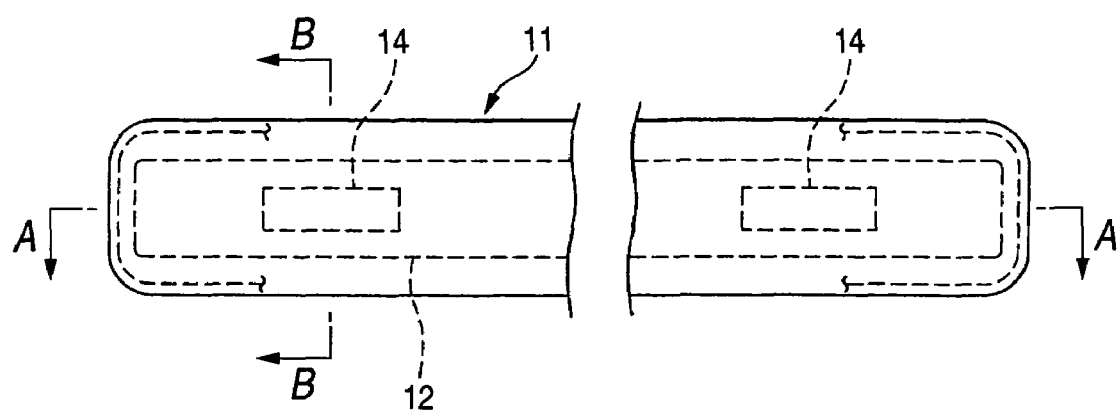
FIG. 2 is a front view of the side molding.
Figure 3:
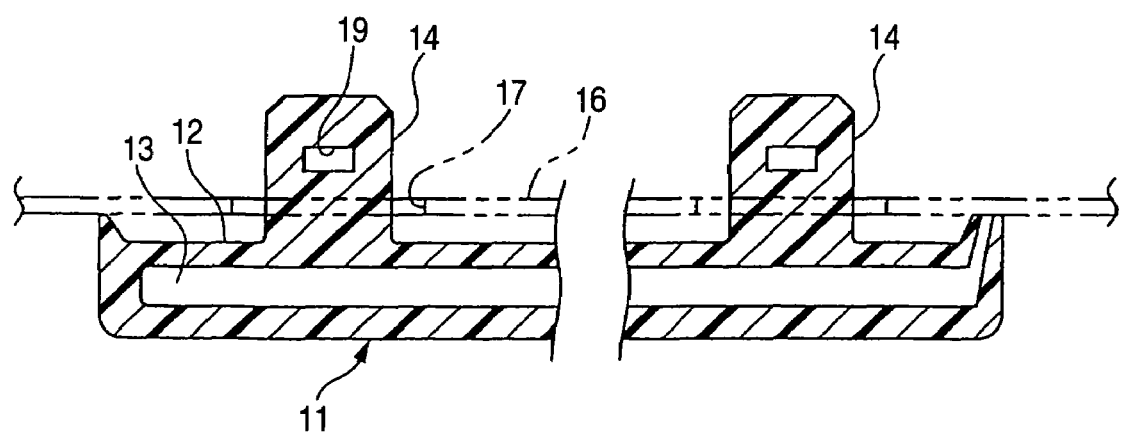
FIG. 3 is a cross-sectional view taken along line A-A in FIG. 2.

The present invention will be described below based on first to third embodiments regarding a structure for attaching a body side molding for decoration of a vehicle body side panel and a body side molding (hereinafter simply referred to as a "side molding") for ornamentation of the side panel.

Referring to FIGS. 1 to 11, a first embodiment of the invention will be described below. First of all, a schematic constitution of a side molding 11 (molded product) will be described using FIGS. 1 to 3. The long side molding 11 is an injection molded resin product having a longitudinal hollow inside and molded of thermoplastic resin such as PP (polypropylene) or ABS (acrylonitrile butadiene styrene) resin by gas assisted injection molding. This side molding 11 may be employed without making the surface treatment, or the surface treatment such as coating, painting and/or plating may be applied on the surface of the side molding 11 to improve the ornamentation or weather resistance. Alternatively, a colored film may be laminated and integrated on the surface of the side molding 11.

Also, a longitudinally extending raised portion 12 is integrally molded on a back surface side of the side molding 11, and a longitudinally extending hollow portion 13 is formed inside this raised portion 12. On a back surface of the hollow portion 13, longitudinally raised portion 12, a plurality of posts 14, 14 are integrally molded at a predetermined interval along the longitudinal direction, with a spacing kept in the longitudinal direction. A mounting clip (fastener) 15 mounted on each post 14 is inserted and engaged into a mounting hole 17 having the shape of an oval coin or rectangle (see FIG. 11) and provided on a vehicle body panel 16 (plate-shaped body to be mounted) in the manner as will be described later, whereby the side molding 11 is attached via the mounting clip 15 to the vehicle body panel 16.

Figure 4:
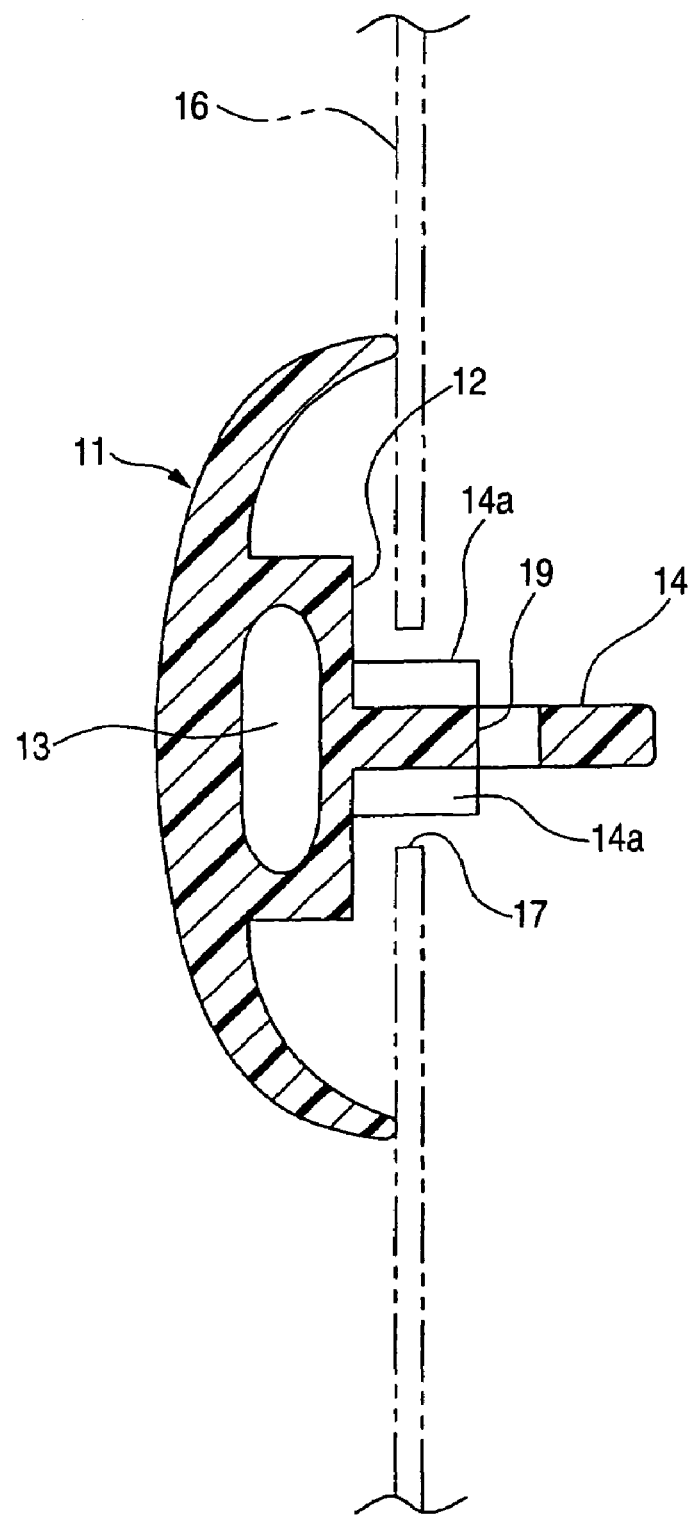
FIG. 4 is a cross-sectional view taken along line B-B in FIG. 2.
Figure 5:
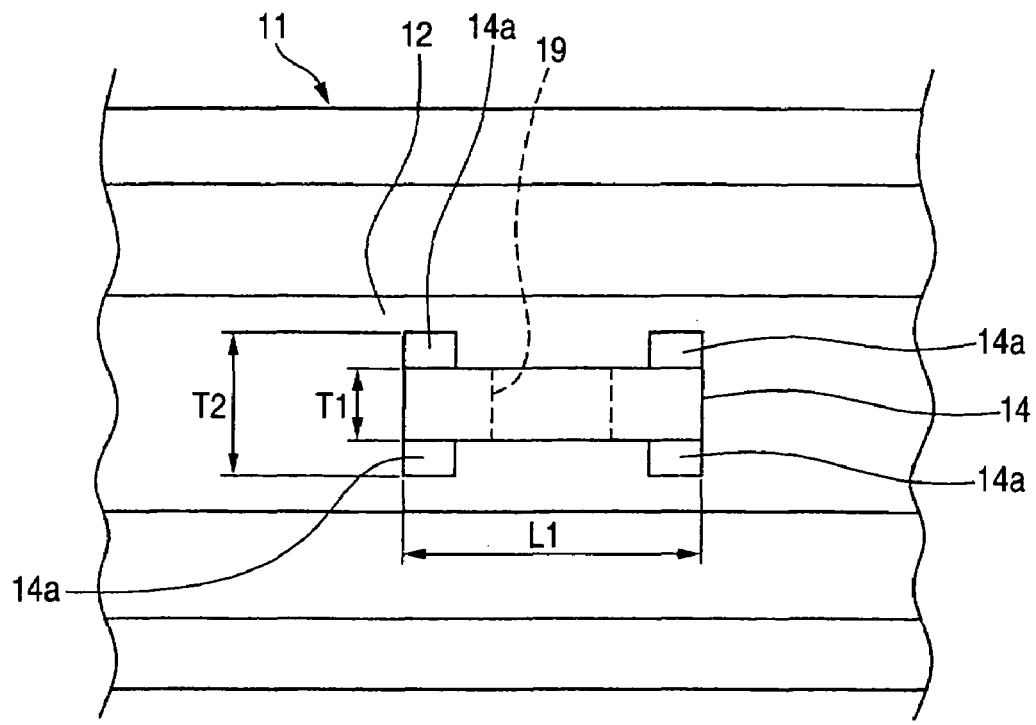
FIG. 5 is an enlarged plan view of a post and its peripheral portion.
Figure 6:
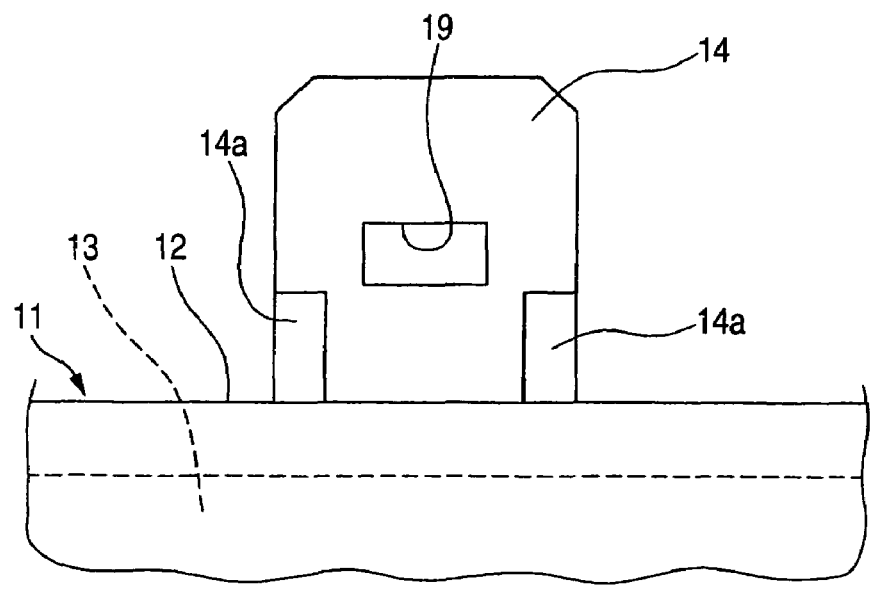
FIG. 6 is an enlarged side view of the post and its peripheral portion.

As shown in FIGS. 4 to 6, each post 14 is formed to project from the back surface of the longitudinally extending raised portion 12 of the side molding 11 toward the vehicle body panel 16. The width or thickness size T1 and the length size L1 of the post 14 (see FIG. 5) are formed to be smaller than the width size D1 and the length size D2 of the mounting hole 17 of the vehicle body panel 16 respectively (see FIG. 11). Thereby, when the side molding 11 is attached on the vehicle body panel 16, the post 14 is inserted beyond the mounting hole 17 to project to the back surface side of the vehicle body panel 16.

In a portion of the post 14 that projects to the back surface side of the vehicle body panel 16, an engagement hole 19 as a holding portion for holding the mounting clip 15 is formed (an engagement recess may be formed instead of the engagement hole 19). At four corners in the root portion of the post 14, ribs 14a, 14a serving for the longitudinal positioning of the mounting clip 15 and the reinforcement of the post 14 are integrally molded so as to be not less than the width of a pinching portion 21 of the mounting clip 15 and not more than the longitudinal internal clearance between an elastic engagement legs 23, 23 of the mounting clip 15. The thickness size T2 of a portion of the post 14 where the rib 14a is formed (see FIG. 5) is formed to be smaller than the width size D1 of the mounting hole 17 of the vehicle body panel 16 (see FIG. 11), so that the rib 14a of the post 14 can be inserted through the mounting hole 17 when the side molding 11 is attached on the vehicle body panel 16.

The mounting clip 15 is formed to be almost symmetrical in the width direction by injection molding of elastic resin such as POM (polyacetal), PA (polyamide), or PBT (polybutyleneterephthalate). As shown in FIGS. 7 to 11, the mounting clip 15 is integrally molded with a bottom portion 20, the pinching portion 21 that is elastically deformable, covering both sides of the post 14 from the bottom portion 20, and shaped like a U-character in cross section for pinching and holding the post 14. The clip has four elastic engagement legs 23, 23 that are elastically deformable, and each leg 23 has an engagement portion 22 engaged with the peripheral edge of the mounting hole 17 of the vehicle body panel 16.

On an inner wall face of the pinching portion 21 for this mounting clip 15, an engagement projection 24 (portion to be held) engaging the engagement hole 19 of the post 14 is formed at the position closer to the root of the post 14 than the bottom portion 20. Also, at four corners of the bottom portion 20 of the mounting clip 15, the elastic engagement legs 23 each extending from an independent position longitudinally apart from the pinching portion 21 toward the root of the post 14 may be formed, whereby two pairs (a total of four) of elastic engagement legs 23 are formed around the post 14 to be located on both side of the post 14 in the width direction and the length direction, with the engagement hook portion 22 being formed at the top end of each elastic engagement leg 23. Each engagement hook portion 22 is shaped like concave to be fitted around the edge of the mounting hole 17 of the vehicle body panel 16. The position of the root of each elastic engagement leg 23 is on the bottom portion 20 and the position of the engagement hook portion 22 is closer to the root of the post 14 than the engagement hole 19 of the post 14, whereby the length of each elastic engagement leg 23 is secured sufficiently, and it is unnecessary to make excessive partial elastic deformation in the leg 23 at the time of mounting on the vehicle body panel 16.

Figure 7:
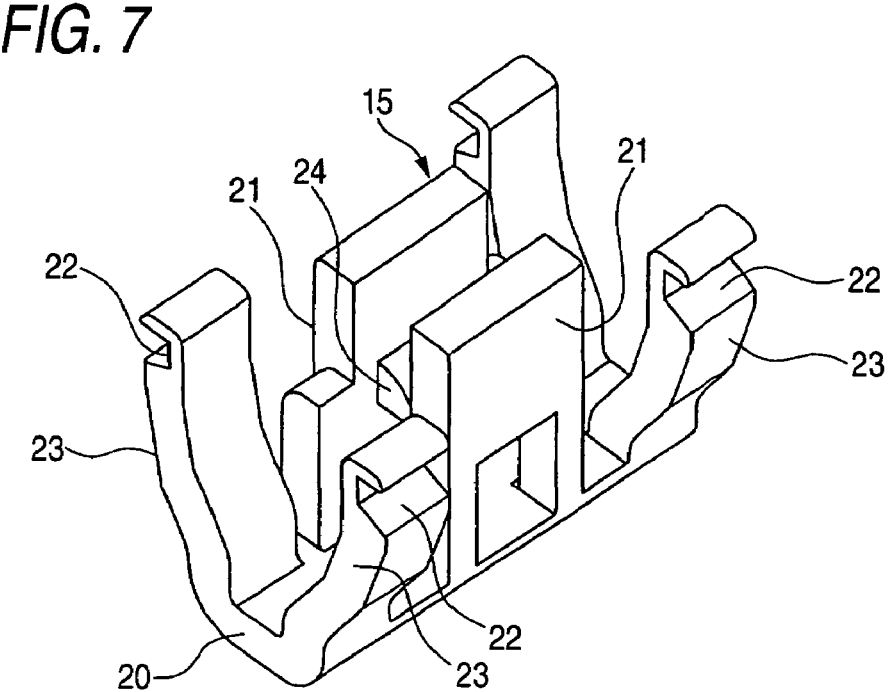
FIG. 7 is an appearance perspective view of a mounting clip.
Figure 8:
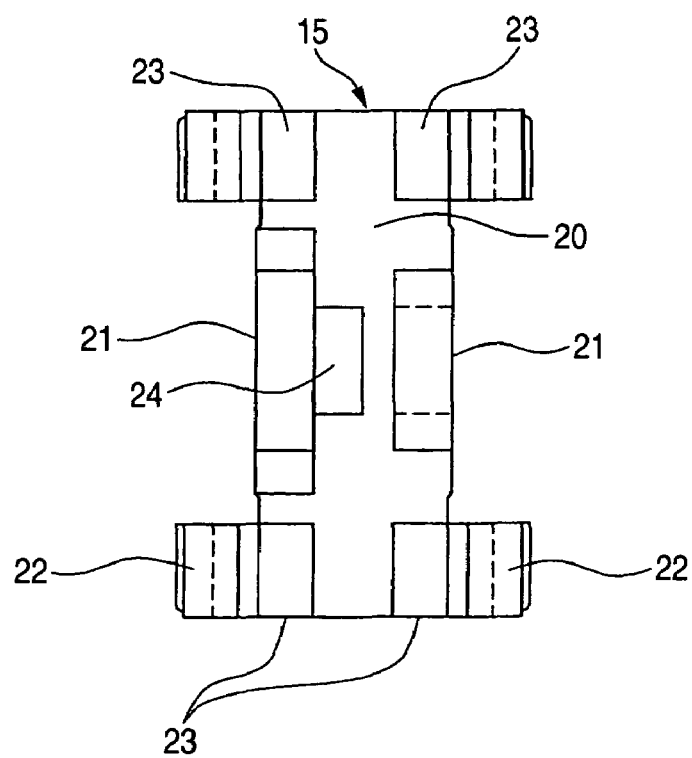
FIG. 8 is a plan view of the mounting clip.
Figure 9:
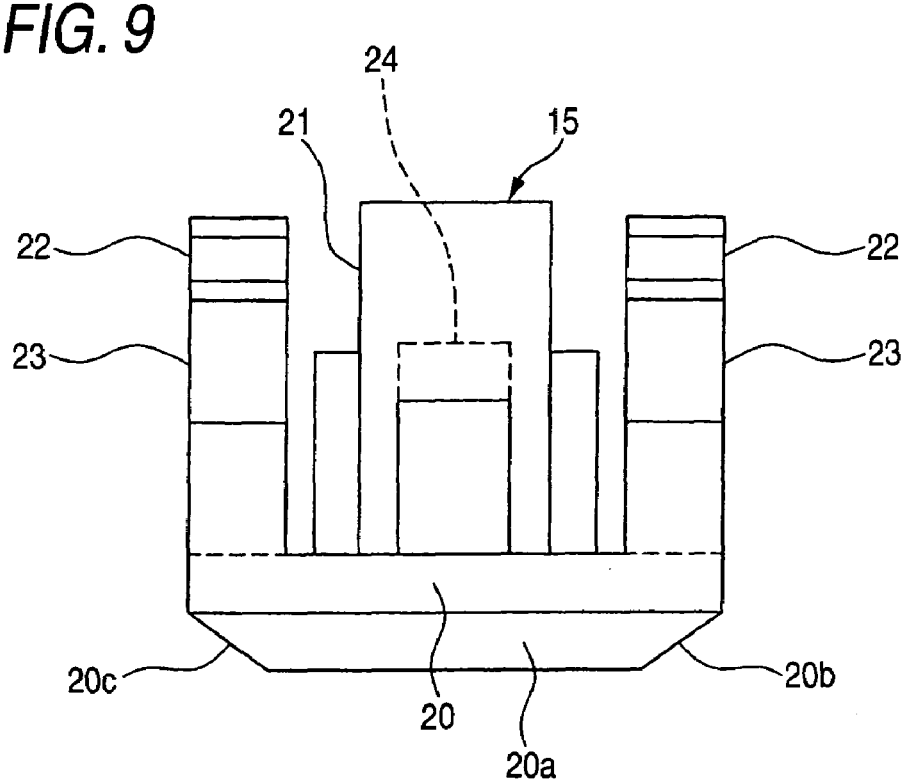
FIG. 9 is a front view of the mounting clip.
Figure 10:
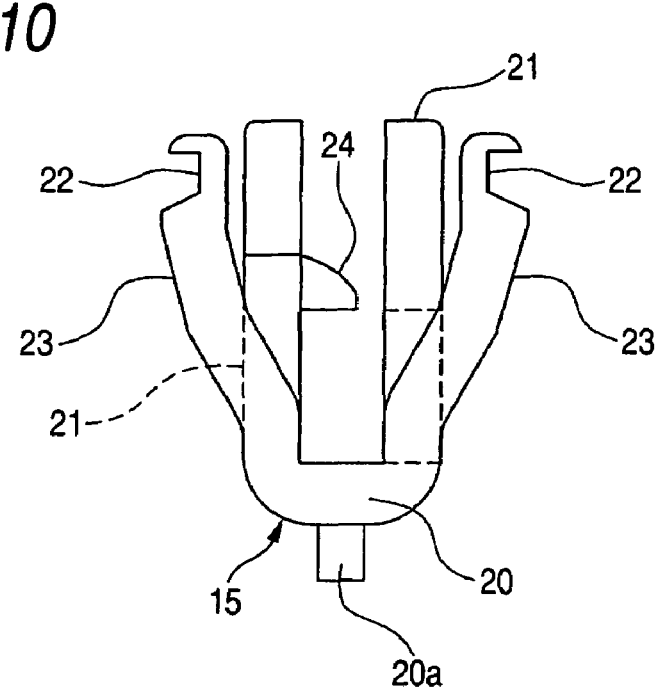
FIG. 10 is a side view of the mounting clip.
Figure 11:
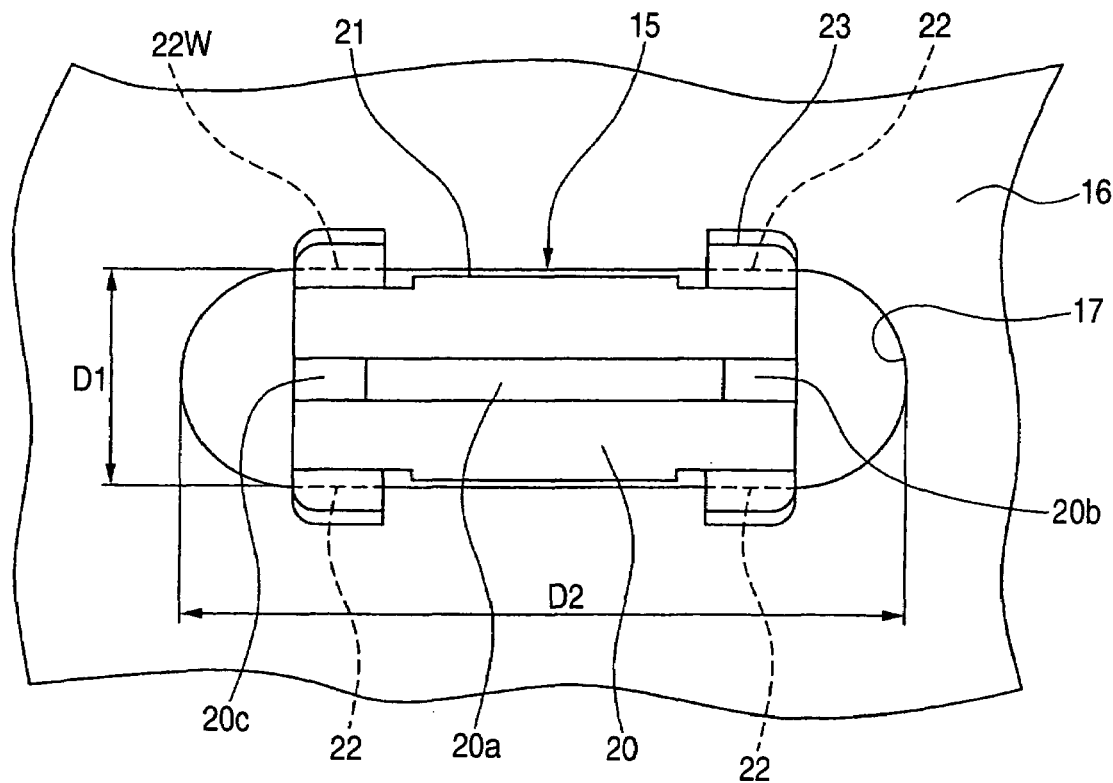
FIG. 11 is a view showing a state where the mounting clip is engaged into a mounting hole of a vehicle body panel, as seen from a back surface side of the vehicle body panel.

Also, two opposed elastic engagement legs 23 of each pair are formed to be mutually expanded like V-character in a free state (see FIGS. 7 and 10). Thereby, when the elastic engagement legs 23 of the mounting clip 15 are inserted and engaged into the mounting hole 17 of the vehicle body panel 16, the elastic engagement legs 23 of the mounting clip 15 are smoothly guided and inserted into the mounting hole 17. Also, as the elastic engagement legs 23 of the mounting clip 15 are inserted into the mounting hole 17, each pair of elastic engagement legs 23 are elastically deformed inwards in a direction approaching to each other, and finally the engagement hook portion 22 is elastically engaged with the edge of the mounting hole 17 due to an elastic restoring force of each pair of elastic engagement legs 23.

In the figures, reference numeral 20a denotes a thin projecting guide that firstly enters into the mounting hole 17 when inserting the mounting clip 15 into the mounting hole 17, and 20b, 20c denote a slanting guide for facilitating the same operation.

There are following two methods for attaching the side molding 11 on the vehicle body panel 16 using this mounting clip 15.

A first attaching method involves mounting the mounting clip 15 on the back surface side of the side molding 11 before the side molding 11 is attached on a vehicle body panel 16 in the following way. First, the pinching portion 21 of the mounting clip 15 is pushed toward the post 14 on the back surface of the side molding 11, and the engagement projection 24 of the mounting clip 15 is fitted and engaged into the engagement hole 19 of the post 14. In this way, the mounting clip 15 is held in each post 14 of the side molding 11.

Thereafter, when the side molding 11 is pushed against the vehicle body panel 16 in a car assembling factory, each mounting clip 15 mounted on the back surface is inserted from the front side of the vehicle body panel 16 into the mounting hole 17 of the vehicle body panel 16, so that the engagement hook portion 22 of each elastic engagement leg 23 of the mounting clip 15 is elastically engaged with the edge of the mounting hole 17. Thereby, the side molding 11 can be attached to the vehicle body panel 16 via the mounting clip 15.

On the other hand, a second attaching method involves preparing the side molding 11 and the mounting clip 15 separately in the car assembling factory, firstly inserting each mounting clip 15 from the front surface side of the vehicle body panel 16 into the mounting hole 17 of the vehicle body panel 16 to elastically engage the engagement hook portion 22 of each elastic engagement leg 23 of the mounting clip 15 with the edge of the mounting hole 17, and attach each mounting clip 15 in the mounting hole 17 of the vehicle body panel 16. In this case, each elastic engagement leg 23 of the mounting clip 15 may be inserted from the back surface side of the vehicle body panel 16 and elastically deformed to elastically engage the engagement hook portion 22 with the edge of the mounting hole 17. At this time, if the engagement hook portion 22 is formed like concave, groove or recess, the engagement hook portion 22 is fitted around the edge of the mounting hole 17, thereby preventing the mounting clip 15 from falling away from the vehicle body panel 16.

Thereafter, each post 14 on the back surface of the side molding 11 is inserted into the pinching portion 21 of each mounting clip 15 attached in the mounting hole 17 of the vehicle body panel 16, and the engagement projection 24 of the mounting clip 15 is fitted and engaged into the engagement hole 19 of the post 14. At this time, if the concave engagement hook portions 22, 22 in the longitudinal direction of the elastic engagement legs 23, 23 are disposed at or near the terminal of a circular portion of the mounting hole 17 in the longitudinal direction, the dislocation of the mounting clip 15 in the longitudinal direction is prevented, so that the dislocation of the side molding 11 in the longitudinal direction with respect to the vehicle body panel 16 is prevented. Thereby, the side molding 11 can be attached to the vehicle body panel 16 via the mounting clip 15.

In the first embodiment as described above, the post 14 projecting beyond the mounting hole 17 of the vehicle body panel 16 to the back surface side of the vehicle body panel 16 is formed on the back surface of the side molding 11, and the mounting clip 15 is held in the post 14, whereby even when there is a narrow clearance between the back surface of the side molding 11 and the vehicle body panel 16, the narrow clearance becomes no hindrance, so that the side molding 11 can be attached on the vehicle body panel 16, using the post 14 of the side molding 11 projecting from the mounting hole 17 of the vehicle body panel 16 to the back surface side of the vehicle body panel 16. Therefore, it is possible to cope with the side moldings in various specifications.

Also, in first embodiment, the engagement projection 24 formed in the pinching portion 21 of the mounting clip 15 is fitted and engaged into the engagement hole 19 formed in the post 14 to hold the mounting clip 15 in the post 14, the mounting clip 15 can be held on the post 14 of the side molding 11 by a simple method of fitting (engaging) the engagement projection 24 into the engagement hole 19, whereby the attachability of the mounting clip 15 is improved.

Moreover, in the first embodiment, the side molding 11 has the post 14 integrally molded on the back surface of the longitudinally raised portion 12 internally formed with the hollow portion 13 by the gas assisted injection molding method, whereby even if a sink occurs due to a difference in the shrinkage characteristic (especially shrinkage amount) between a portion for molding the post 14 in the side molding 11 and its peripheral portion, the sink mark occurs only on the hollow inner wall of the longitudinally raised portion 12 that is not seen from the outside, so that the sink mark does not occur on the surface of the side molding 11. Therefore, the appearance quality on the front surface is kept excellent without causing sink mark on the surface of the side molding 11, and the height size and the thickness size of the post 14 can be increased, whereby the mounting clip 15 can be held stably.

Also, in the first embodiment, the elastic engagement leg 23 is formed at each of four corners of the mounting clip 15, and a total of four (two pairs) of elastic engagement legs 23 are disposed on both sides of the post 14 (in the width direction and the longitudinal direction), with the post 14 in the center, whereby the side molding 11 can be mounted in the mounting hole 17 of the vehicle body panel 16 via the mounting clip 15 well-balanced and stably.

Also, in the first embodiment, the position of the root of the elastic engagement leg 23 of the mounting clip 15 is on the bottom portion 20, while the position of the engagement hook portion 22 is closer to the root of the post 14 than the engagement hole 19 of the post 14, whereby the length of the elastic engagement leg 23 is easily secured, and when the engagement hook portion 22 at the top end side of the elastic engagement leg 23 is engaged with the edge of the mounting hole 17 of the vehicle body panel 16, the elastic engagement leg 23 is elastically deformed smoothly but not partially excessively. When the elastic engagement leg 23 is elastically deformed inwards, there is no hindrance for elastic deformation, because there is no interfering or contacting part on the back side of the elastic engagement leg 23.

Also, in the first embodiment, the engagement hook portion 22 of the mounting clip 15 is formed like concave, groove or recess to be fitted around the edge of the mounting hole 17 for the vehicle body panel 16, whereby the engagement hook portion 22 of the mounting clip 15 is engaged and held with the edge of the mounting hole 17 of the vehicle body panel 16 not to be slipped off in the directions to the front and back. Therefore, the side molding 11 can be attached on the vehicle body panel 16 stably without causing the mounting clip 15 to get rid of the mounting hole 17, even by the method of mounting beforehand the mounting clip 15 into the mounting hole 17 of the vehicle body panel 16, and then mounting the side molding 11 on the mounting clip 15.

However, the shape of the engagement hook portion 22 for the mounting clip 15 is not necessarily formed like concave, but may be formed to prevent slip-off in the front direction (without the hook portion at the top end of the engagement hook portion 22) from the edge of the mounting hole 17 of the vehicle body panel 16. With this shape, when the mounting clip 15 is mounted beforehand on the side molding 11, the mounting clip 15 is inserted into the mounting hole 17 of the vehicle body panel 16 from the front surface side of the vehicle body panel 16, whereby the mounting clip 15 is prevented from getting rid of the mounting hole 17 of the vehicle body panel 16 in the front direction.

Figure 12:
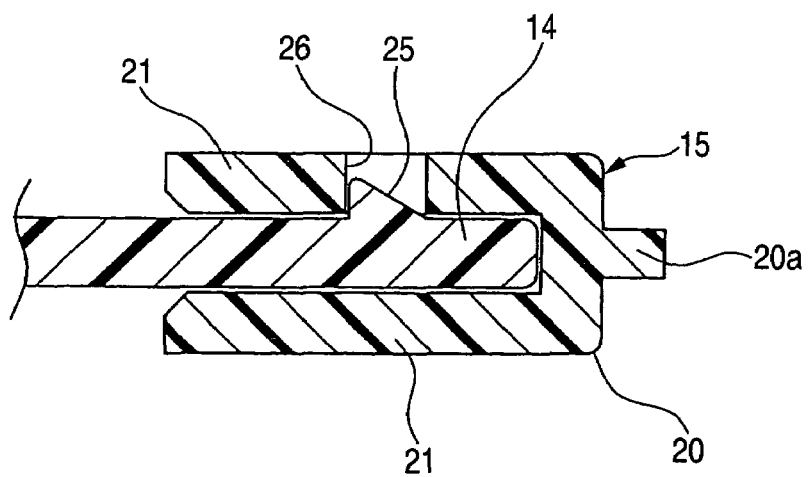
FIG. 12 is a cross-sectional view showing a connection structure between a post and a mounting clip according to a modified example of the first embodiment.

Though in the first embodiment, the engagement projection 24 formed in the pinching portion 21 of the mounting clip 15 is fitted and engaged into the engagement hole 19 formed in the post 14, the engagement projection 25 (holding portion) formed in the post 14 may be fitted and engaged into the engagement hole 26 (portion to be held) formed in the pinching portion 21 of the mounting clip 15, as shown in FIG. 12. Also in this case, the engagement recess may be formed instead of the engagement hole 26.

Moreover, in the first embodiment, the plate-shaped posts 14, 14 may be molded in parallel to each other with a predetermined spacing in the width direction, while the pinching portion 21 of the mounting clip 15 may be molded like one plate, and the plate like pinching portion 21 may be inserted into the clearance between the posts 14, 14. In this case, the concave and convex fitting between both may be employed as previously described.

Moreover, the two posts 14, 14 may be molded in parallel to each other and with a spacing in the longitudinal direction. In this case, the pinching portions 21, 21 of the mounting clip 15 are molded with a spacing in the longitudinal direction, and the elastic engagement leg 23 is molded in the middle between two pinching portions 21, 21.

Figure 13:
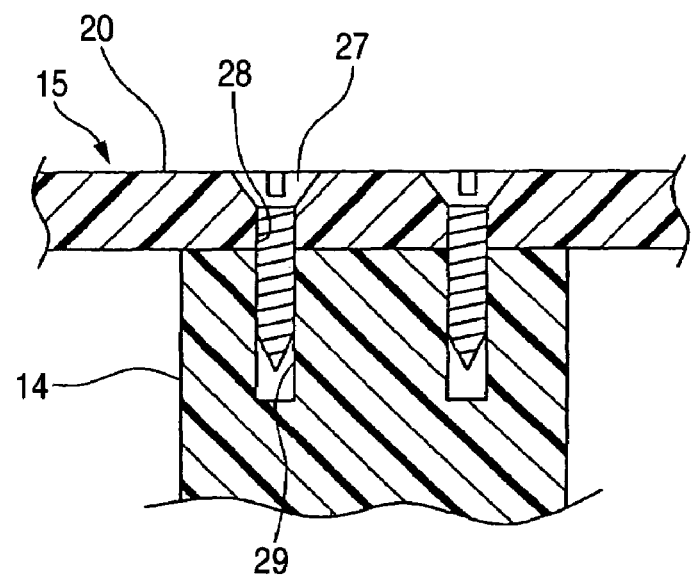
FIG. 13 is a cross-sectional view showing a connection structure between a post and a mounting clip according to a second embodiment.

Referring to FIG. 13, a second embodiment of the invention will be described below. The same or like parts are designated by the same numerals as in the first embodiment, and not described here. Different parts from the first embodiment will be mainly described.

In the second embodiment, a hole or tapped hole 29 (holding portion) for fastening a screw 27 (fastener) is formed at a predetermined position (preferably at the top end) of the post 14, and correspondingly, a through hole for screw 28 (portion to be held) is formed at a predetermined position on the bottom portion 20 of the mounting clip 15. And the screw 27 such as a tapping screw inserted through the through hole for screw 28 on the bottom portion 20 is fastened into the hole 29 of the post 14, whereby the bottom portion 20 of the mounting clip 15 is connected and held to the post 14.

In the second embodiment as described above, since the post 14 and the bottom portion 20 of the mounting clip 15 are connected by the screw 27, there is no need for providing the engagement hole (or engagement recess) in the post 14 and the pinching portion 21, the shapes of the post 14 and the pinching portion 21 of the mounting clip 15 are made simple, whereby there is an advantage that the structure of a mold for molding them is simplified, and the clip molding cost is reduced.

Means for connecting the post 14 and the bottom portion 20 of the mounting clip 15 is not limited to the screw 27 such as tapping screw, but may be any fastener (e.g., rivet) other than the screw 27.

Figure 14:
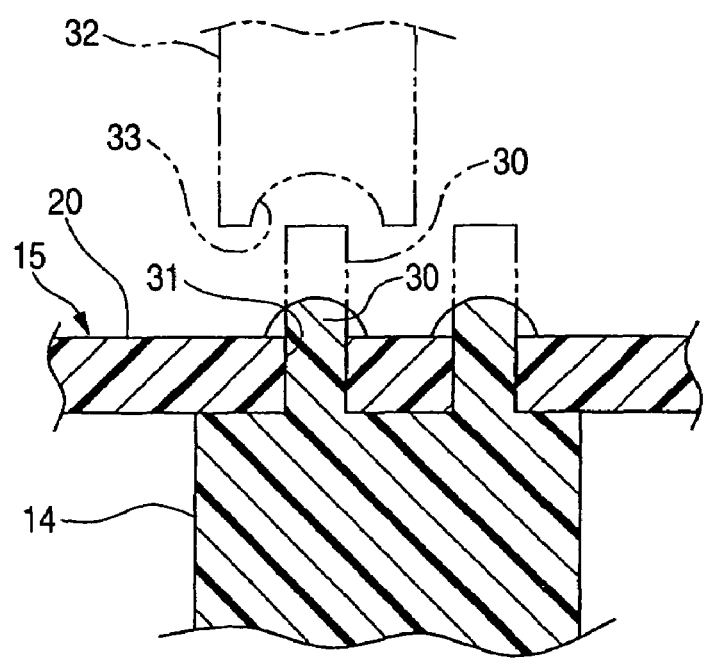
FIG. 14 is a cross-sectional view showing a connection structure between a post and a mounting clip according to a third embodiment.

Referring to FIG. 14, a third embodiment of the invention will be described below. The same or like parts are designated by the same numerals as in the first embodiment, and not described here. Different parts from the example 1 will be mainly described.

In the third embodiment, a boss 30 (indicated by the two-dot chain line in FIG. 14) as a holding portion for holding the mounting clip 15 is formed at a predetermined position (e.g., top end portion) of the post 14, and correspondingly, a through hole 31 (portion to be held) for inserting the boss 30 is formed at a predetermined position on the bottom portion 20 of the mounting clip 15. In a process of mounting the mounting clip 15 in the post 14, the boss 30 of the post 14 is inserted into the through hole 31 of the bottom portion 20, and a concaved portion 33 formed at the top end of a heating head 32 is covered on the top end portion of the boss 30 and pressed in a state where a top end portion of the boss 30 is protruded from the through hole 31 of the bottom portion 20, as indicated by the two-dot chain line in FIG. 14. Thereby, the top end portion of the boss 30 is heated and softened, and squeezed like semi-sphere to cause plastic deformation, whereby the boss 30 is firmly secured in the through hole 31, and the bottom portion 20 of the mounting clip 15 is connected with the post 14 and held, as indicated by the solid line in FIG. 14.

In the third embodiment as described above, since the boss 30 formed in the post 14 is subject to plastic deformation to connect the post 14 and the bottom portion 20 of the mounting clip 15, whereby, as of the second embodiment, there is no need for providing the engagement hole (or engagement recess) and the engagement projections in the post 14 and the pinching portion 21, the shapes of the post 14 and the pinching portion 21 of the mounting clip 15 are made simple, whereby there is an advantage that the structure of a mold for molding them is simplified, and the molding cost of the mounting clip 15 is reduced.

A predetermined portion (holding portion) of the post 14 and a predetermined portion (portion to be held) of the bottom portion 20 of the mounting clip 15 may be connected by welding or bonding.

Though in the first to third embodiments, the mounting clip 15 is formed of resin having elasticity, the mounting clip 15 may be formed by press molding an elastic metal plate (e.g., spring steel plate). Also, it is only necessary that at least two elastic engagement legs 23 are molded as a pair in the width direction.

Moreover, though in the first to third embodiments, the side molding 11 is attached on the vehicle body panel 16 using the mounting clip 15, the side molding 11 may be attached to the vehicle body panel 16, using a double faced pressure sensitive adhesive tape 40 in addition to the mounting clip 15. In this case, the pressure sensitive adhesive tape 40 may be provided along the back surface of the peripheral edge of the side molding 11 in the width direction in FIG. 1.

In addition, the invention is not limited to the side molding for automobile, but may be widely applicable to various moldings in which the fastener is mounted on the back surface side of the molded product made of resin, and the fastener is inserted and engaged into the mounting hole of the plate-shaped body to be mounted. Various changes or modifications may be made.

What is claimed is:

1. A molded product assembly comprising:
a molded product having a predetermined shape; and
a fastener attached to a back surface side of the molded product;
wherein the molded product is mountable to a plate-shaped body to be mounted having a mounting hole via the fastener that is inserted into the mounting hole to engage with the mounting hole;
wherein the molded product comprises:
a post projecting toward the mounting hole and disposed on a back surface of the molded product, at least a part of the post projecting through the mounting hole to a back surface side of the body to be mounted in mounting the molded product assembly to the body to be mounted; and
a holding portion disposed on the part of the post to hold the fastener; and
wherein the fastener comprises:
a portion to be held that is held by the holding portion; and
a plurality of elastic engagement legs, each elastic engagement leg being elastically deformable and having an engagement portion to be engaged with a peripheral edge of the mounting hole, each elastic engagement leg being located on the back surface side of the body to be mounted,
wherein at least a pair of the plurality of elastic engagement legs have a longitudinal internal clearance between them, the longitudinal internal clearance between the at least the pair of elastic engagement legs being larger than a width dimension of the post in a longitudinal direction when the width of the clearance between the at least the pair of engagement legs and the width of the post in the longitudinal direction are compared, and
the plurality of elastic engagement legs are independently formed and are elastically deformed inward without interference with the post.

2. The molded product assembly according to claim 1, wherein one of the holding portion of the post and the portion to be held of the fastener has a recess or a hole and the other has a projection that is formed to be fit and engaged with the recess or the hole.

3. The molded product assembly according to claim 1, further comprising a screw that connects the holding portion and the portion to be held.

4. The molded product assembly according to claim 1, wherein the holding portion and the portion to be held are connected by means of welding or plastic deformation.

5. The molded product assembly according to claim 1, wherein the molded product has a hollow portion and the post is integrally formed on a back surface of the hollow portion.

6. The molded product assembly according to claim 1, wherein the portion to be held of the fastener is positioned closer to a tip end of the post than the engagement portion.

7. The molded product assembly according to claim 1, wherein the body to be mounted is a vehicle body panel.

8. The molded product assembly according to claim 1, wherein the holding portion is formed in the part of the post projecting through the mounting hole to the back surface side of the body to be mounted.

9. The molded product assembly according to claim 1, wherein the post has a shape in the form of a plate which is formed in a longitudinal direction perpendicular to a width direction of the molded product; and
the fastener comprises a pinching portion on which the portion to be held is provided, the pinching portion pinching the post from both sides of the post in the width direction of the molded product.

10. The molded product assembly according to claim 1, wherein the post has a shape in the form of a plate which is formed in a longitudinal direction perpendicular to a width direction of the molded product;

the post comprises a pair of reinforcement ribs at a root portion thereof, the reinforcement ribs being formed in the longitudinal direction at a predetermined interval; and the fastener comprises a pinching portion on which the portion to be held is provided, the pinching portion pinching the post from both sides of the post in the width direction of the molded product, the pinching portion being located between the pair of reinforcement ribs.

11. The molded product assembly according to claim 1, wherein the molded product is a long member;

the long member includes a plurality of posts formed in a longitudinal direction of the molded product at intervals; and a plurality of fasteners are held by the plurality of posts respectively.

* * * * *